United States Patent
Uenishi et al.

(10) Patent No.: US 11,001,654 B2
(45) Date of Patent: May 11, 2021

(54) DIENE POLYMER, METHOD FOR PRODUCING DIENE POLYMER, AND RUBBER COMPOSITION

(71) Applicant: THE YOKOHAMA RUBBER CO., LTD., Tokyo (JP)

(72) Inventors: Kazuya Uenishi, Kanagawa (JP); Naoya Amino, Kanagawa (JP); Makoto Ashiura, Kanagawa (JP); Motoji Fujita, Kanagawa (JP); Satoshi Mihara, Kanagawa (JP); Yu Shinke, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 519 days.

(21) Appl. No.: 15/758,927

(22) PCT Filed: Sep. 8, 2016

(86) PCT No.: PCT/JP2016/076367
§ 371 (c)(1),
(2) Date: Mar. 9, 2018

(87) PCT Pub. No.: WO2017/043553
PCT Pub. Date: Mar. 16, 2017

(65) Prior Publication Data
US 2018/0282446 A1    Oct. 4, 2018

(30) Foreign Application Priority Data

Sep. 11, 2015 (JP) .............. JP2015-179306
Mar. 23, 2016 (JP) .............. JP2016-058342

(51) Int. Cl.
| | |
|---|---|
| C08F 36/06 | (2006.01) |
| C08C 19/22 | (2006.01) |
| C08C 19/25 | (2006.01) |
| C08C 19/42 | (2006.01) |
| C08F 4/46 | (2006.01) |
| C08F 4/48 | (2006.01) |
| C08F 4/52 | (2006.01) |
| C08F 8/42 | (2006.01) |
| C08F 36/02 | (2006.01) |
| C08L 9/00 | (2006.01) |

(52) U.S. Cl.
CPC ............ *C08F 36/06* (2013.01); *C08C 19/22* (2013.01); *C08C 19/25* (2013.01); *C08C 19/42* (2013.01); *C08F 4/46* (2013.01); *C08F 4/48* (2013.01); *C08F 4/52* (2013.01); *C08F 8/42* (2013.01); *C08F 36/02* (2013.01); *C08L 9/00* (2013.01); *Y02T 10/86* (2013.01)

(58) Field of Classification Search
CPC .... C08F 36/06; C08F 4/46; C08F 4/48; C08F 4/52; C08F 8/42; C08F 36/02; C08C 19/22; C08C 19/25; C08C 19/42; C08L 9/00; Y02T 10/86

USPC .......................................... 526/83
See application file for complete search history.

(56) References Cited

U.S. PATENT DOCUMENTS

| | | | |
|---|---|---|---|
| 4,080,492 A | 3/1978 | de Zarauz | |
| 4,616,069 A | 10/1986 | Watanabe et al. | |
| 4,996,273 A * | 2/1991 | Van Der Huizen | ..... C08C 19/02 502/153 |
| 5,064,800 A | 11/1991 | Van Der Huizen | |
| 5,100,965 A | 3/1992 | Hsu et al. | |
| 6,624,267 B1 | 9/2003 | Favrot et al. | |
| 2002/0183469 A1 | 12/2002 | Halasa et al. | |
| 2003/0069365 A1 | 4/2003 | Grun et al. | |

(Continued)

FOREIGN PATENT DOCUMENTS

| | | |
|---|---|---|
| EP | 1 285 932 A2 | 2/2003 |
| JP | H04-209602 A | 7/1992 |
| JP | 07-082422 A | 3/1995 |

(Continued)

OTHER PUBLICATIONS

KR-101503339-B1—machine translation (Year: 2015).*

(Continued)

*Primary Examiner* — Ling Siu Choi
*Assistant Examiner* — Ronald Grinsted
(74) *Attorney, Agent, or Firm* — Carrier Blackman & Associates, P.C.; Joseph P. Carrier; Anne G. Sabourin

(57) ABSTRACT

The present invention is to provide a diene polymer that exhibits excellent low rolling resistance when used in a tire, a method for producing the diene polymer, and a rubber composition containing the diene polymer. The diene polymer of an embodiment of the present invention is produced by polymerizing a monomer containing at least a diene monomer by using an initiator prepared from an organolithium compound, an alkyl aluminum, and a metal alcoholate, and then terminating the polymerization by using an electrophile selected from the group consisting of titanium halides, tin halides, cyclic silazanes, alkoxysilanes, epoxides, amines, ketones, and compounds represented by Formula (N) below.

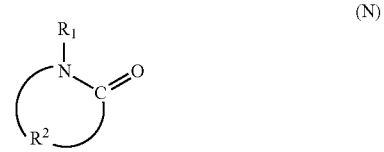

(N)

22 Claims, 1 Drawing Sheet

(56) References Cited

U.S. PATENT DOCUMENTS

2006/0149010 A1   7/2006   Halasa et al.

FOREIGN PATENT DOCUMENTS

| JP | 2712622 B2 | 2/1998 |
| JP | 2006-188682 A | 7/2006 |
| KR | 101503339 B1 * | 3/2015 |
| WO | 97/23521 A | 7/1997 |

OTHER PUBLICATIONS

Office Action issued in the corresponding Japanese Patent Application 2017-507458, the drafting dated Jul. 27, 2017, with a partial English translation thereof.
Extended European search report dated Apr. 12, 2019 issued in the corresponding EP patent application 16844414.9.

* cited by examiner

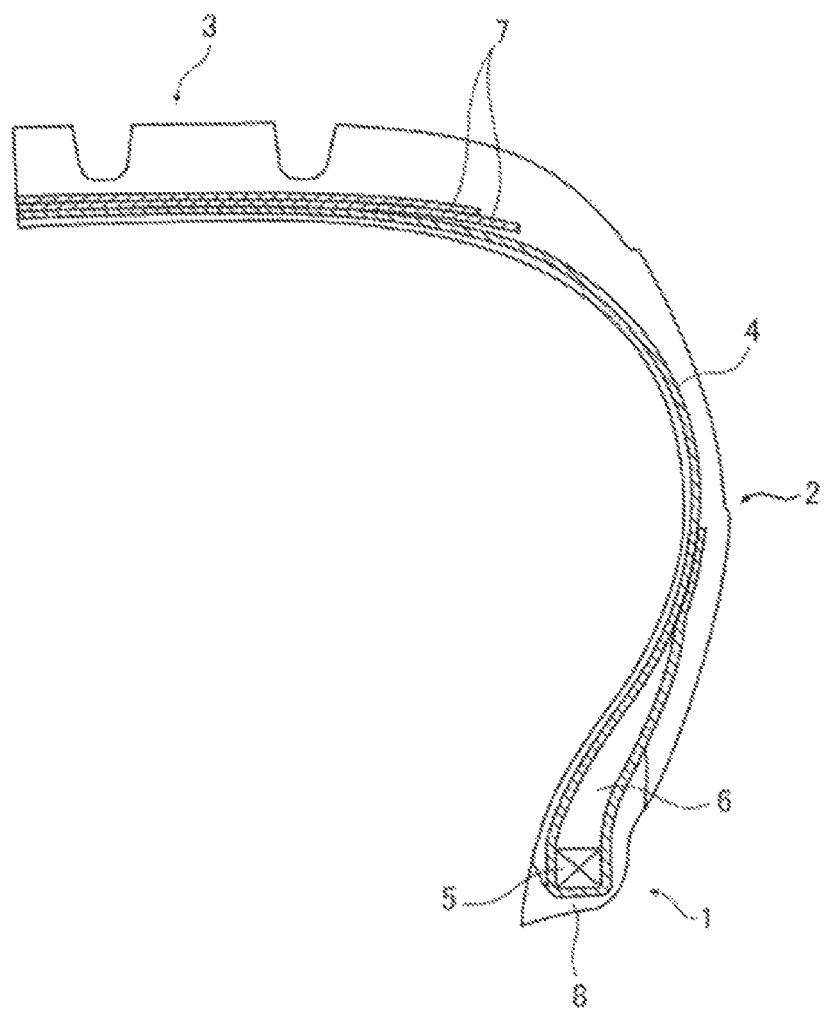

DIENE POLYMER, METHOD FOR PRODUCING DIENE POLYMER, AND RUBBER COMPOSITION

TECHNICAL FIELD

The present invention relates to a diene polymer, a method for producing a diene polymer, and a rubber composition.

BACKGROUND ART

Butadiene homopolymers (BR), butadiene-styrene copolymers (SBR), and the like have been known as rubber materials used in tires and the like.

Note that BR and SBR are produced mainly by emulsion polymerization or solution polymerization. For example, Patent Document 1 discloses, as a method for producing a conjugated diene polymer by solution polymerization, a method for producing a conjugated diene polymer that polymerizes a monomer formed from a conjugated diene or a conjugated diene and an aromatic vinyl compound in an inert organic solvent by using a catalyst composition containing (a)dialkoxy barium compound, (b) organoaluminum compound, (c) organolithium compound, and (d) an amine compound represented by General Formula (I) or a diamine compound represented by General Formula (II).

CITATION LIST

Patent Literature

Patent Document 1: JP 2712622 B

SUMMARY OF INVENTION

Technical Problem

There has been a demand to reduce tire rolling resistance from the perspective of enhancing fuel efficiency when a vehicle is traveling. Therefore, a method for reducing tire rolling resistance by low heat build-up achieved by making the hysteresis loss (especially, tan δ at high temperatures) small by blending silica into a diene rubber that constitutes a tread portion in a tire has been known. Furthermore, to enhance the rigidity and the wear resistance of the tire, carbon black is typically compounded in a diene rubber.

In such a circumstance, when the inventors of the present invention prepared a rubber composition by blending silica and carbon black into the conjugated diene polymer (diene polymer) described in Patent Document 1 and produced a tire, it was found that the rolling resistance did not necessarily satisfy the level that is required recently.

Therefore, in light of the circumstance described above, an object of the present invention is to provide a diene polymer that exhibits excellent low rolling resistance when used in a tire, a method for producing the diene polymer, and a rubber composition containing the diene polymer.

Solution to Problem

As a result of diligent research on the problems described above, the inventors of the present invention found that the problems described above can be solved by polymerizing a monomer by using an initiator prepared from an organolithium compound, alkyl aluminum, and metal alcoholate, and then terminating the polymerization by using a particular electrophile, and thus completed the present invention.

Specifically, the inventors of the present invention found that the problems described above can be solved by the following features.

(1) A diene polymer produced by polymerizing a monomer containing at least a diene monomer by using an initiator prepared from an organolithium compound, an alkyl aluminum, and a metal alcoholate, and then terminating the polymerization by using an electrophile selected from the group consisting of titanium halides, tin halides, cyclic silazanes, alkoxysilanes, epoxides, amines, ketones, and compounds represented by Formula (N) described below.

(2) The diene polymer according to (1) above, where a phenol compound is added to a polymerization system when the monomer is polymerized.

(3) The diene polymer according to (1) or (2) above, where a vinyl group content is 20% or less.

(4) The diene polymer according to any one of (1) to (3) above, where a weight average molecular weight is from 1000 to 10000000.

(5) The diene polymer according to any one of (1) to (4) above, where the diene monomer is 1,3-butadiene or isoprene.

(6) The diene polymer according to any one of (1) to (5) above, where the monomer further contains an aromatic vinyl.

(7) The diene polymer according to (6) above, where the aromatic vinyl is styrene or α-methylstyrene.

(8) The diene polymer according to (6) or (7) above, where a content of the aromatic vinyl in the monomer is at least 20 mol %, and
a glass transition temperature (Tg) is −50° C. or lower.

(9) The diene polymer according to any one of (1) to (8) above, where the initiator is prepared by using the organolithium compound, the alkyl aluminum, the metal alcoholate, and an aromatic divinyl.

(10) A method for producing a diene polymer, the method producing a diene polymer by
polymerizing a monomer containing at least a diene monomer by using an initiator prepared from an organolithium compound, an alkyl aluminum, and a metal alcoholate, and
then, terminating the polymerization by using an electrophile selected from the group consisting of titanium halides, tin halides, cyclic silazanes, alkoxysilanes, epoxides, amines, ketones, and compounds represented by Formula (N) described below.

(11) A rubber composition containing the diene polymer described in any one of (1) to (9) above.

Advantageous Effects of Invention

As described below, according to the present invention, a diene polymer that exhibits excellent low rolling resistance when used in a tire, a method for producing the diene polymer, and a rubber composition containing the diene polymer can be provided.

BRIEF DESCRIPTION OF DRAWING

FIG. 1 is a partial cross-sectional schematic view of a tire that represents a tire according to an embodiment of the tire in which the diene polymer of the present invention is used.

DESCRIPTION OF EMBODIMENTS

The diene polymer according to an embodiment of the present invention and a method for producing a diene polymer according to an embodiment of the present invention are described below.

Note that, in the present specification, numerical ranges indicated by using "(from) . . . to . . . " include the former number as the lower limit value and the later number as the upper limit value.

Diene Polymer

The diene polymer of an embodiment of the present invention (hereinafter, also referred to as "polymer of an embodiment of the present invention") is produced by polymerizing a monomer containing at least a diene monomer by using an initiator prepared from an organolithium compound, an alkyl aluminum, and a metal alcoholate, and then terminating the polymerization by using an electrophile selected from the group consisting of titanium halides, tin halides, cyclic silazanes, alkoxysilanes, epoxides, amines, ketones, and compounds represented by Formula (N) described below.

The polymer of an embodiment of the present invention achieves desired effects as a result of having such a configuration. Although the reason is not clear, by allowing a terminal formed by polymerization with a particular electrophile to interact with silica and carbon black, dispersibility of the silica and the carbon black is enhanced, and activity of the terminal of the polymer is suppressed.

Note that, although the polymer of an embodiment of the present invention has a terminal structure derived from an electrophile, it is not possible or not practical to identify the specific terminal structure thereof. Furthermore, in the polymer of an embodiment of the present invention, as described below, it has been known that the vinyl group content becomes small by using a particular initiator. However, the microstructure of contents except the vinyl group may also be changed, and the polymer structure (e.g. arrangement of monomers and degree of linking of monomers) except the microstructure may also be changed due to the use of the particular initiator. Therefore, the desired effects are achieved by a combination of the terminal structure described above and the change in the main chain structure of such a polymer by using the particular initiator. Therefore, it is not possible or not practical to identify the polymer of an embodiment of the present invention, including the main chain structure thereof.

Initiator

As described above, in an embodiment of the present invention, an initiator prepared from an organolithium compound, an alkyl aluminum, and a metal alcoholate (hereinafter, also referred to as "particular initiator") is used for the polymerization of the monomer. That is, in an embodiment of the present invention, an initiator prepared by using an organolithium compound, an alkyl aluminum, and a metal alcoholate (particular initiator) is used for the polymerization of the monomer.

The particular initiator is preferably an initiator further using an aromatic divinyl. That is, an initiator is preferably prepared by using an organolithium compound, an alkyl aluminum, a metal alcoholate, and an aromatic divinyl. By using an aromatic divinyl, the obtained copolymer is branched, the molecular weight is increased, and mechanical properties and wear resistance are enhanced when the polymer is used in a tire.

Organolithium Compound

Examples of the organolithium compound include monoorganolithium compounds, such as n-butyllithium, sec-butyllithium, tert-butyllithium, n-propyllithium, iso-propyllithium, and benzyllithium; and polyfunctional organolithium compounds, such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene, and 1,3,5-trilithio-2,4,6-triethylbenzene. Monoorganolithium compounds such as n-butyllithium, sec-butyllithium, tert-butyllithium are particularly preferable.

The amount of the organolithium compound used in the preparation of the particular initiator is not particularly limited but is preferably from 0.001 to 10 mol % relative to the amount of the monomer to be polymerized.

Alkyl Aluminum

The alkyl aluminum is not particularly limited as long as the alkyl aluminum is a compound in which an alkyl group (open chain, branched chain, or cyclic) is bonded to an aluminum atom (Al). Although the number of carbons in the alkyl group is not particularly limited, the number of carbons is preferably from 1 to 20, and more preferably from 1 to 10. Specific examples of the alkyl aluminum include trimethylaluminum, triethylaluminum, triisopropylaluminum, tributylaluminum, triisobutylaluminum, tripropylaluminum, tributylaluminum, triisobutylaluminum, pentyldiethylaluminum, 2-methylpentyl-diethylaluminum, dicyclohexylethylaluminum, tripentylaluminum, trihexylaluminum, trioctylaluminum, tri(2-ethylhexyl)aluminum, tricyclohexylaluminum, tricyclopentylaluminum, tri(2,2,4-trimethylpentyl)aluminum, tridodecylaluminum, tri(2-methylpentyl)aluminum, diisobutylaluminum hydride, diethylaluminum hydride, dipropylaluminum hydride, propylaluminum dihydride, isobutylaluminum dihydride, and the like. Among these, trioctylaluminum is preferable.

The proportion of the alkyl aluminum relative to the organolithium compound used in the preparation of the particular initiator is not particularly limited but is preferably from 0.1 to 50 molar equivalents, and more preferably from 0.5 to 10 molar equivalents. Note that 1 molar equivalent represents an amount in the case where 1 mol of an alkyl aluminum is added when 1 mol of an organolithium compound is used. That is, the proportion of the alkyl aluminum relative to the organolithium compound used in the preparation of the particular initiator is not particularly limited but is preferably from 10 to 5000 mol %, and more preferably from 50 to 1000 mol %.

Metal Alcoholate

The metal alcoholate (metal alkoxide) is not particularly limited as long as the metal alcoholate is a compound in which hydrogen of a hydroxy group of an alcohol is substituted with a metal.

Although the metal is not particularly limited, examples of the metal include alkali metals, alkaline earth metals, transition metals (metals of group 3 to group 11), aluminum, germanium, tin, and antimony. Among these, an alkaline earth metal (calcium, barium, and the like) is preferable, and barium is more preferable.

The alcohol is not particularly limited as long as the alcohol is a compound in which a hydrogen atom of the open-chain, branched chain, or cyclic hydrocarbon is substituted with a hydroxy group. Although the number of carbons in the alcohol is not particularly limited, the number of carbons is preferably from 1 to 30, and more preferably from 1 to 20.

The metal alcoholate is preferably barium alcoholate (barium alkoxide). Examples of the barium alkoxide include barium dimethoxide, barium diethoxide, barium dipropoxide, barium dibutoxide, and barium bis(2-ethylhexoxide).

The proportion of the metal alcoholate relative to the organolithium compound used in the preparation of the particular initiator is not particularly limited but is preferably from 0.01 to 5 molar equivalents, and more preferably from 0.1 to 3 molar equivalents. Note that 1 molar equivalent represents an amount in the case where 1 mol of a metal alcoholate is added when 1 mol of an organolithium compound is used. That is, the proportion of the metal alcoholate relative to the organolithium compound used in the preparation of the particular initiator is not particularly limited but is preferably from 1 to 500 mol %, and more preferably from 10 to 300 mol %.

Aromatic Divinyl

The aromatic divinyl is not particularly limited as long as the aromatic divinyl is an aromatic compound having two vinyl groups. Among these, divinylbenzene is preferable.

The proportion of the aromatic divinyl relative to the organolithium compound used in the preparation of the particular initiator is not particularly limited but is preferably from 0.1 to 5 molar equivalents, and more preferably from 0.3 to 3 molar equivalents. Note that 1 molar equivalent represents an amount in the case where 1 mol of an aromatic divinyl is added when 1 mol of an organolithium compound is used. That is, the proportion of the aromatic divinyl relative to the organolithium compound used in the preparation of the particular initiator is not particularly limited but is preferably from 10 to 500 mol %, and more preferably from 30 to 300 mol %.

Method for Preparing Particular Initiator

The method for preparing the particular initiator is not particularly limited, but examples thereof include a method, in which the organolithium compound, the alkyl aluminum, and the metal alcoholate described above, and the like are dissolved in a solvent.

The type of solvent is not particularly limited and, for example, an organic solvent or the like can be used; however, the solvent is preferably a solvent except alcohols.

Monomer

As described above, in an embodiment of the present invention, a monomer containing at least a diene monomer is used.

Examples of the diene monomer include butadiene (e.g. 1,3-butadiene), isoprene, and chloroprene. Among these, the diene monomer is preferably 1,3-butadiene or isoprene.

The proportion of the diene monomer in the monomer is not particularly limited but is preferably from 10 to 100 mol %.

The monomer preferably contains an aromatic vinyl.

Examples of the aromatic vinyl include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinyl naphthalene, dimethylaminomethylstyrene, and dimethylaminoethylstyrene. Among these, styrene, α-methylstyrene, and 4-methylstyrene are preferred, and styrene is more preferred. A single aromatic vinyl may be used alone, or a combination of two or more types of aromatic vinyls may be used.

The proportion (content) of the aromatic vinyl in the monomer is not particularly limited, and is preferably from 0 to 90 mol %, and more preferably from 10 to 50 mol %.

The monomer may contain a monomer except the diene monomer or the aromatic vinyl. Examples of such a monomer include α- and β-unsaturated nitriles, such as acrylonitrile and methacrylonitrile; unsaturated carboxylic acids or acid anhydrides, such as acrylic acid, methacrylic acid, and maleic anhydride; unsaturated carboxylic acid esters, such as methyl methacrylate, ethyl acrylate, and butyl acrylate; and non-conjugated dienes, such as 1,5-hexadiene, 1,6-heptadiene, 1,7-octadiene, dicyclopentadiene, and 5-ethylidene-2-norbornene.

Polymerization of Monomer

As described above, in an embodiment of the present invention, the monomer containing at least the diene monomer is polymerized by using the particular initiator. The particular initiator and the monomer are as described above.

The polymerization method of the monomer is not particularly limited. Examples thereof include a method in which the monomer described above is added to an organic solvent solution containing the particular initiator described above and agitated in a temperature range of 0 to 120° C. (preferably 30 to 100° C.), and the like.

The proportion of the organolithium compound in the particular initiator relative to the monomer is not particularly limited but is preferably from 0.001 to 100 mol %, more preferably from 0.01 to 10 mol %, and even more preferably from 0.1 to 1 mol %.

When the monomer is polymerized, a phenol compound, an amine compound, or an alcohol may be added to the polymerization system (e.g. an organic solvent solution containing the particular initiator described above). By adding the phenol compound, the microstructure of the obtained diene polymer can be controlled ("cis/trans/vinyl" described below).

Note that the phenol compound means a compound having a phenolic hydroxy group or a metal salt thereof. Furthermore, the amine compound means a compound having an amino group (—NH$_2$, —NHR, —NR$_2$). Note that R represents a substituent. The specific examples and preferred forms of the substituent are the same as those of R in Formula (P) described below. Two R moieties of the —NR$_2$ may be the same or different.

Examples of the phenol compound include a compound represented by Formula (P) below.

[Chemical Formula 1]

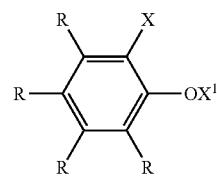

(P)

In Formula (P) above, $X^1$ represents a hydrogen atom or a metal atom. Examples of the metal atom include a sodium atom, a lithium atom, and a potassium atom.

In Formula (P) above, R represents a hydrogen atom or a substituent. Note that the plurality of R moieties may be the same or different.

The substituent is not particularly limited as long as the substituent is a monovalent substituent. Examples thereof include a halogen atom, a hydroxy group, a nitro group, a carboxy group, an alkoxy group, an amino group, a mercapto group, an acyl group, an imide group, a phosphino group, a phosphinyl group, a silyl group, and a hydrocarbon group that may have a hetero atom.

Examples of the halogen atom include a fluorine atom, a chlorine atom, a bromine atom, and an iodine atom.

Examples of the hetero atom of the hydrocarbon group that may have a hetero atom include an oxygen atom, a nitrogen atom, a sulfur atom, and a phosphorous atom.

Examples of the hydrocarbon group that may have a hetero atom include aliphatic hydrocarbon groups, aromatic hydrocarbon groups, and groups that have a combination of these.

The aliphatic hydrocarbon group may be in a form of straight-chain, branched-chain, or ring. Specific examples of the aliphatic hydrocarbon group include straight-chain or branched alkyl groups (especially, those having from 1 to 30 carbons), straight-chain or branched alkenyl groups (especially, those having from 2 to 30 carbons), and straight-chain or branched alkynyl groups (especially, those having from 2 to 30 carbons).

Examples of the aromatic hydrocarbon group include aromatic hydrocarbon groups having from 6 to 18 carbons, such as a phenyl group, a tolyl group, a xylyl group, and a naphthyl group.

In Formula (P) above, X represents a hydrogen atom, an —$OX^1$ group, or a substituent. $X^1$ is as described above. Furthermore, specific examples of the substituent are the same as those described for R in Formula (P) described above.

Examples of the compound represented by Formula (P) above include 4-tert-butylpyrocatechol, and the like.

The amount of the phenol compound to be added is not particularly limited, but the amount is preferably from 0.01 to 90 mol %, more preferably from 0.1 to 80 mol %, and even more preferably from 1 to 20 mol %, relative to the amount of the organolithium compound.

Electrophile

As described above, in an embodiment of the present invention, an electrophile (hereinafter, also referred to as "particular electrophile") selected from the group consisting of titanium halides, tin halides, cyclic silazanes, alkoxysilanes, epoxides, amines, ketones, and compounds represented by Formula (N) described below is used when the polymerization is terminated. Note that, when the electrophile is a titanium halide, tin halide, or compound represented by Formula (N) described below, the terminal of the polymer of an embodiment of the present invention presumably interacts with carbon black. When the electrophile is a cyclic silazane, alkoxysilane, or amine, the terminal of the polymer of an embodiment of the present invention presumably interacts with silica. When the electrophile is an epoxide or ketone, the terminal of the polymer of an embodiment of the present invention presumably interacts with silica or carbon black.

The particular electrophile is preferably a cyclic silazane, alkoxysilane, or a compound represented Formula (N) described below, and more preferably a cyclic silazane from the perspective of exhibiting excellent wear resistance when used in a tire.

Titanium Halide

The titanium halide is not particularly limited, and examples thereof include $TiCl_3$, $TiBr_3$, $Ti(OC_2H_5)Cl_2$, $Ti(OC_4H_9)Cl_2$, $TiCl_4$, $Ti(OC_2H_5)Cl_3$, and $Ti(OC_4H_9)Cl_3$. Among these, $TiCl_3$ (titanium trichloride) and $TiCl_4$ (titanium tetrachloride) are preferable, and titanium tetrachloride is more preferable.

Tin Halide

The tin halide is not particularly limited, and examples thereof include tin fluoride, tin chloride, tin bromide, tin iodide, and tin astatide.

Cyclic Silazane

The cyclic silazane is not particularly limited as long as the cyclic silazane is a silazane having a ring shape.

Note that the silazane means a compound having a structure in which a silicon atom and a nitrogen atom are directly bonded (a compound having an Si—N bond).

The cyclic silazane is preferably a compound represented by Formula (S) below.

[Chemical Formula 2]

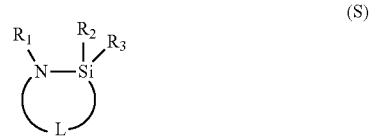

In Formula (S) above, $R_1$ to $R_3$ each independently represent a hydrogen atom or a substituent. Specific examples of the substituent are the same as those described for R in Formula (P) described above.

$R_1$ is preferably an alkyl group (preferably having from 1 to 10 carbons), an alkylsilyl group (preferably having from 1 to 10 carbons), and an aromatic hydrocarbon group (preferably from 6 to 18 carbons).

$R_2$ is preferably an alkoxy group (preferably having from 1 to 10 carbons).

In Formula (S) above, L represents a divalent organic group.

Examples of the divalent organic group include substituted or unsubstituted aliphatic hydrocarbon groups (e.g. alkylene group, preferably having from 1 to 8 carbons), substituted or unsubstituted aromatic hydrocarbon groups (e.g. arylene group, preferably having from 6 to 12 carbons), —O—, —S—, —$SO_2$—, —N(R)— (R: alkyl group), —CO—, —NH—, —COO—, —CONH—, and groups in which these are combined (e.g. alkyleneoxy group (—$C_mH_{2m}O$—; m is a positive integer), alkyleneoxy carbonyl group, and alkylene carbonyloxy group).

L is preferably an alkylene group (preferably having from 1 to 10 carbons).

Examples of the compound represented by Formula (S) above include N-n-butyl-1,1-dimethoxy-2-azasilacyclopentane, N-phenyl-1,1-dimethoxy-2-azasilacyclopentane, N-trimethylsilyl-1,1-dimethoxy-2-azasilacyclopentane, and N-trimethylsilyl-1,1-diethoxy-2-azasilacyclopentane.

Note that the silicon atom of the cyclic silazane exhibits electrophilicity.

Alkoxysilane

The alkoxysilane is not particularly limited as long as the alkoxysilane is a compound having an alkoxysilyl group. Examples thereof include tetramethoxysilane, methyltrimethoxysilane, dimethyldimethoxysilane, tetraethoxysilane, methyltriethoxysilane, dimethyldiethoxysilane, phenyltrimethoxysilane, diphenyldimethoxysilane, phenyltriethoxysilane, diphenyldiethoxysilane, hexyltrimethoxysilane, hexyltriethoxysilane, 3-glycidoxypropyltrimethoxysilane, 3-glycidoxypropyltriethoxysilane, 3-glycidoxypropylmethyldimethoxysilane, N,N-bistrimethylsilyl-3-aminopropyltrimethoxysilane, and N,N-bistrimethylsilyl-3-aminopropyltriethoxysilane.

The number of alkoxy groups in the alkoxysilyl group is not particularly limited but is preferably 2 or greater.

Note that the silicon atom of the alkoxysilane exhibits electrophilicity.

Epoxide

The epoxide is not particularly limited as long as the epoxide is a compound having an oxacyclopropane (oxirane) structure.

Specific examples of the epoxide include ethylene oxide, propylene oxide, butylene oxide, cyclohexene oxide, styrene oxide, 1-phenylpropylene oxide, methyl glycidyl ether, ethyl glycidyl ether, glycidyl isopropyl ether, butyl glycidyl ether, 1-methoxy-2-methylpropylene oxide, allyl glycidyl ether, 2-ethyloxyl glycidyl ether, phenyl glycidyl ether, p-tert-butylphenyl glycidyl ether, lauryl alcohol glycidyl ether, stearyl glycidyl ether, palmityl glycidyl ether, myristyl glycidyl ether, lauryl glycidyl ether, capryl glycidyl ether, and caproyl glycidyl ether.

Amine

The amine is not particularly limited as long as the amine is a compound having an amino group (—NR$_2$: R represents a hydrogen atom or a hydrocarbon group. The two R moieties may be the same or different). Among these, aziridine is preferable from the perspective of achieving superior effect of the present invention. Examples of the aziridine include N-methylaziridine, N-ethylaziridine, N-isopropylaziridine, N-phenylaziridine, N-(4-methylphenyl)aziridine, and N-methyl-2-methylaziridine.

Ketone

The ketone is not particularly limited as long as the ketone is a compound having a ketone group (—CO—).

Specific examples of the ketone include acetone, benzophenone, and derivatives of these.

Examples of the derivative of benzophenone include N,N,N',N'-tetramethyl-4,4'-diaminobenzophenone, N,N,N',N'-tetraethyl(4,4'-diamino)-benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone, and 4,4'-diacetylbenzophenone.

Compound Represented by Formula (N)

The compound represented by Formula (N) below is described below.

[Chemical Formula 3]

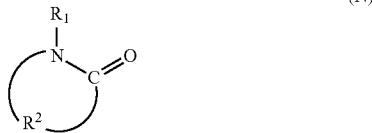

(N)

In Formula (N) above, R$^1$ represents a hydrogen atom or an alkyl group (preferably having from 1 to 10 carbons), and R$^2$ represents an alkylene group (preferably having from 2 to 10 carbons).

Specific examples of the compounds represented by Formula (N) above include N-methylpyrrolidone (in Formula (N) above, R$_1$ is a methyl group, and R$_2$ is a propylene group).

The amount of the electrophile relative to the amount of the initiator is not particularly limited. However, the proportion of the electrophile relative to the organolithium compound (electrophile/organolithium compound) is, in terms of molar ratio, preferably from 0.1 to 10, and more preferably from 1 to 5 from the perspective of achieving superior effect of the present invention.

The proportion of the electrophile relative to the alkyl aluminum (electrophile/alkyl Al) is, in terms of molar ratio, preferably from 0.1 to 10, and more preferably from 1 to 5 from the perspective of achieving superior effect of the present invention.

The proportion of the electrophile relative to the metal alcoholate (electrophile/metal alcoholate) is, in terms of molar ratio, preferably from 0.1 to 20, and more preferably from 1 to 10 from the perspective of achieving superior effect of the present invention.

Termination of Polymerization

As described above, in an embodiment of the present invention, the polymerization is terminated by using the particular electrophile. The particular electrophile is as described above.

The method for terminating the polymerization is not particularly limited, and examples thereof include a method in which the particular electrophile described above is added to the polymerization solution, and the like.

By terminating the polymerization by using the particular electrophile, the particular electrophile is added to the terminal and modified.

Polymer

As described above, the polymer of an embodiment of the present invention is produced by polymerizing a monomer containing at least the diene monomer by using the particular initiator, and then terminating the polymerization by using the electrophile selected from the group consisting of titanium halides, tin halides, cyclic silazanes, alkoxysilanes, epoxides, amines, ketones, and compounds represented by Formula (N) described below (particular electrophile).

The polymer of an embodiment of the present invention is preferably a terminal-modified BR or a terminal-modified SBR.

The content of the styrene unit in the polymer is preferably from 0 to 90 mass %, and more preferably from 10 to 50 mass %, from the perspective of achieving superior effect of the present invention. Among these, the content is preferably 18 mass % or greater, more preferably 20 mass % or greater, and even more preferably 30 mass % or greater from the perspective of achieving superior effect of the present invention.

Molecular Weight

The molecular weight of the polymer of an embodiment of the present invention is not particularly limited but is, in terms of weight average molecular weight (Mw), preferably from 1000 to 10000000, more preferably from 2000 to 5000000, and even more preferably from 3000 to 2000000. Among these, the molecular weight is preferably 10000 or greater, and more preferably 100000 or greater. Note that, in the present specification, the number average molecular weight (Mn) and the weight average molecular weight (Mw) are measured by gel permeation chromatography (GPC) in the following conditions based on calibration with polystyrene standard.

Solvent: Tetrahydrofuran
Detector: RI detector

Cis-Bond Content, Trans-Bond Content, and Vinyl Group Content

In the polymer of an embodiment of the present invention, the cis-bond content is not particularly limited. However, the cis-bond content is preferably from 1 to 80%, and more preferably from 3 to 70% from the perspective of achieving superior effect of the present invention. Among these, the cis-bond content is preferably from 17 to 60%, more preferably from 20 to 55%, and even more preferably from 25 to 50% from the perspective of achieving superior effect of the present invention.

Note that the cis-bond content refers to the proportion (mol %) of the cis-1,4 bond among units derived from dienes (butadiene, isoprene, and the like) in the diene polymer (cis-1,4 bond, trans-1,4-bond, 1,2-vinyl bond (in the case of isoprene, 3,4-vinyl bond)).

In the polymer of an embodiment of the present invention, the trans-bond content is not particularly limited. However, the trans-bond content is preferably from 10 to 99%, more preferably from 20 to 99%, and even more preferably from 25 to 97% from the perspective of achieving superior effect of the present invention. Among these, the trans-bond content is preferably from 27 to 80%, and more preferably from 30 to 75% from the perspective of achieving superior effect of the present invention. Among these, the trans-bond content is preferably from 30 to 70%, and more preferably from 30 to 60% from the perspective of achieving superior effect of the present invention.

Note that the trans-bond content refers to the proportion (mol %) of the trans-1,4 bond among units derived from dienes (butadiene, isoprene, and the like) in the diene polymer (cis-1,4 bond, trans-1,4-bond, 1,2-vinyl bond (in the case of isoprene, 3,4-vinyl bond)).

In the polymer of an embodiment of the present invention, the vinyl group content is not particularly limited. However, the vinyl group content is preferably 20% or less, and more preferably 10% or less from the perspective of achieving superior effect of the present invention. Among these, the vinyl group content is preferably from 8% or less, and more preferably 5% or less from the perspective of achieving superior effect of the present invention. The lower limit is not particularly limited and is 0%.

As described above, because the particular initiator is used in the polymerization of the monomer in an embodiment of the present invention, the vinyl group content in the diene polymer of an embodiment of the present invention is small (e.g. 20% or less).

Note that vinyl group content refers to the proportion (mol %) of the 1,2-vinyl bond among units derived from dienes (butadiene, isoprene, and the like) in the diene polymer (cis-1,4 bond, trans-1,4-bond, 1,2-vinyl bond (in the case of isoprene, 3,4-vinyl bond)).

Note that, in the present specification, the proportion of the cis-bond content and the trans-bond content and the vinyl group content is also represented as "cis/trans/vinyl".

Glass Transition Temperature

The glass transition temperature (Tg) of the polymer of an embodiment of the present invention is not particularly limited. However, the glass transition temperature is preferably −50° C. or lower, more preferably −60° C. or lower, even more preferably −70° C. or lower, and particularly preferably −80° C. or lower from the perspective of achieving superior effect of the present invention. Although the lower limit is not particularly limited, the lower limit is preferably −100° C. or higher, and more preferably −90° C. or higher.

Note that, in the present specification, the glass transition temperature (Tg) is measured by using a differential scanning calorimeter (DSC) at the rate of temperature increase of 20° C./min, and calculated by the midpoint method.

Method for Producing Polymer of the Present Invention

The method for producing a polymer of an embodiment of the present invention is a method that produces a diene polymer by polymerizing a monomer containing at least a diene monomer by using an initiator prepared from an organolithium compound, an alkyl aluminum, and a metal alcoholate (particular initiator), and then terminating the polymerization by using an electrophile selected from the group consisting of titanium halides, tin halides, cyclic silazanes, alkoxysilanes, epoxides, amines, ketones, and compounds represented by Formula (N) described above (particular electrophile).

The particular initiator, the monomer, the polymerization method of the monomer, the particular electrophile, and the termination method of the polymerization are as described above.

Use

The polymer of an embodiment of the present invention can be widely used in rubber products, such as tires, conveyor belts, and hoses. Among these, the polymer is useful for tires. In particular, the polymer is useful for tires produced by using a rubber composition containing silica and/or carbon black.

The tire produced by using a rubber composition containing the polymer of an embodiment of the present invention and silica and/or carbon black exhibits extremely high dispersibility of the silica and the carbon black and excellent low rolling resistance.

The rubber composition described above may contain other components besides the polymer of an embodiment of the present invention, the silica, and the carbon black. Examples of such components include various additives that are typically used in rubber compositions, such as silane coupling agents, zinc oxide (zinc oxide), stearic acid, adhesive resin, peptizing agent, anti-aging agents, wax, processing aids, aroma oils, liquid polymers, terpene resins, thermosetting resins, vulcanizing agents (for example, sulfur), and vulcanization accelerators.

Furthermore, the rubber composition described above may contain a rubber component besides the polymer of an embodiment of the present invention. Examples of such a rubber component include a natural rubber (NR), isoprene rubber (IR), butadiene rubber (BR), styrene-butadiene rubber (SBR), acrylonitrile-butadiene copolymer rubber (NBR), butyl rubber (IIR), halogenated butyl rubber (Br-IIR, Cl-IIR), and chloroprene rubber (CR).

Tire

The tire of an embodiment of the present invention is a tire produced by using the polymer of an embodiment of the present invention described above. Among these, the tire is preferably a tire produced by using the rubber composition containing the polymer of an embodiment of the present invention.

FIG. 1 is a partial cross-sectional schematic view of a tire that represents a tire according to an embodiment of the present invention, but the tire according to an embodiment of the present invention is not limited to the embodiment illustrated in FIG. 1.

In FIG. 1, reference sign 1 denotes a bead portion, reference sign 2 denotes a sidewall portion, and reference sign 3 denotes a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire circumference of the tire on the outer side of the carcass layer 4.

Additionally, rim cushions 8 are provided in portions of the bead portions 1 that are in contact with a rim.

The tire according to an embodiment of the present invention can be produced, for example, in accordance with a known method. In addition to ordinary air or air with an adjusted oxygen partial pressure, inert gases such as nitrogen, argon, and helium can be used as the gas with which the tire is filled.

EXAMPLES

Embodiments of the present invention are described in further detail below. However, the present invention is not limited to these embodiments.

Synthesis of Diene Polymer

Comparative Example 1: SBR

An initiator solution (corresponding to the particular initiator described above) was prepared by using n-BuLi (available from Kanto Chemical Co., Inc.; 1.55 mol/L (hexane solution), 3.3 mL, 5.12 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 1.5 mL), trioctylaluminum (available from Aldrich; 25 wt. % (hexane solution), 9 mL), and cyclohexane (available from Kanto Chemical Co., Inc.; 7 mL). The initiator solution was heated to 60° C., and a mixture of 1,3-butadiene (available from Aldrich; 15 wt. % (hexane solution), 30.6 g, 84.9 mmol) and styrene (available from Kanto Chemical Co., Inc.; 3.99 g, 38.3 mmol) was added thereto and agitated at 60° C. for 4 hours. After the mixture was cooled to room temperature, methanol (available from Kanto Chemical Co., Inc.; 5 mL) was added to terminate the polymerization. The obtained polymer solution was taken out and concentrated under reduced pressure. The concentrated solution was poured into methanol (400 mL), and a methanol-insoluble component was separated. As a result, a butadiene-styrene copolymer (SBR) (5.49 g; Mn=6510; Mw=7590, PDI (polydispersity: Mw/Mn)=1.2) was obtained in a yield of 64%. Note that, by IR spectroscopy, cis/trans/vinyl was estimated to be 11/83/6.

$^1$H-NMR of Comparative Example 1 (CDCl$_3$, 20° C.): δ=7.3-6.4 (br), 5.5-4.7 (br), 3.8-3.6 (br), 2.5-0.7 (br).

Note that (br) means that the peak was broad.

Example 1: Cyclic Silazane Terminal-Modified SBR

An initiator solution (corresponding to the particular initiator described above) was prepared by using n-BuLi (available from Kanto Chemical Co., Inc.; 1.55 mol/L (hexane solution), 3.3 mL, 5.12 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 1.5 mL), trioctylaluminum (available from Aldrich; 25 wt. % (hexane solution), 9 mL), and cyclohexane (available from Kanto Chemical Co., Inc.; 7 mL). The initiator solution was heated to 60° C., and a mixture of 1,3-butadiene (available from Aldrich; 15 wt. % (hexane solution), 31.9 g, 88.5 mmol) and styrene (available from Kanto Chemical Co., Inc.; 3.98 g, 38.2 mmol) was added thereto and agitated at 60° C. for 4 hours. After the mixture was cooled to room temperature, 2-n-butyl-1,1-dimethoxy-2-azasilacyclopentane (available from AZmax Co.; 1.10 g) was added to terminate the polymerization. The obtained polymer solution was taken out and concentrated under reduced pressure. The concentrated solution was poured into methanol (400 mL), and a methanol-insoluble component was separated. As a result, a butadiene-styrene copolymer (cyclic silazane terminal-modified SBR) (6.31 g, Mn=6840, Mw=8820, PDI=1.3) was obtained in a yield of 72%. Note that, by IR spectroscopy, cis/trans/vinyl was estimated to be 11/85/4.

$^1$H-NMR of Example 1 (CDCl$_3$, 20° C.): δ=7.2-6.3 (br), 5.4-4.6 (br), 3.8-3.5 (br), 2.6-0.4 (br).

Example 2: Titanium Halide Terminal-Modified SBR

An initiator solution (corresponding to the particular initiator described above) was prepared by using n-BuLi (available from Kanto Chemical Co., Inc.; 1.55 mol/L (hexane solution), 3.3 mL, 5.12 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 1.5 mL), trioctylaluminum (available from Aldrich; 25 wt. % (hexane solution), 9 mL), and cyclohexane (available from Kanto Chemical Co., Inc.; 7 mL). The initiator solution was heated to 60° C., and a mixture of 1,3-butadiene (available from Aldrich; 15 wt. % (hexane solution), 32.5 g, 90.1 mmol) and styrene (available from Kanto Chemical Co., Inc.; 4.03 g, 38.2 mmol) was added thereto and agitated at 60° C. for 4 hours. After the mixture was cooled to room temperature, titanium tetrachloride (available from Aldrich; 2.06 g) was added to terminate the polymerization. The obtained polymer solution was taken out and concentrated under reduced pressure. The concentrated solution was poured into methanol (400 mL), and a methanol-insoluble component was separated. As a result, a butadiene-styrene copolymer (titanium halide terminal-modified SBR) (5.97 g, Mn=8040, Mw=11100, PDI=1.4) was obtained in a yield of 67%. Note that, by IR spectroscopy, cis/trans/vinyl was estimated to be 15/78/7.

$^1$H-NMR of Example 2 (CDCl$_3$, 20° C.): δ=7.2-6.3 (br), 5.4-4.7 (br), 4.8-4.5 (br), 2.7-0.7 (br).

Example 3: Tin Halide Terminal-Modified SBR

An initiator solution (corresponding to the particular initiator described above) was prepared by using n-BuLi (available from Kanto Chemical Co., Inc.; 1.60 mol/L (hexane solution), 3.3 mL, 5.28 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 1.5 mL), trioctylaluminum (available from Aldrich; 25 wt. % (hexane solution), 9 mL), and cyclohexane (available from Kanto Chemical Co., Inc.; 7 mL). The initiator solution was heated to 60° C., and a mixture of 1,3-butadiene (available from Aldrich; 15 wt. % (hexane solution), 31.4 g, 87.1 mmol) and styrene (available from Kanto Chemical Co., Inc.; 3.77 g, 36.2 mmol) was added thereto and agitated at 60° C. for 4 hours. After the mixture was cooled to room temperature, tin chloride (SnCl$_4$) (available from Kanto Chemical Co., Inc.; 2.21 g) was added to terminate the polymerization. The obtained polymer solution was taken out and concentrated under reduced pressure. The concentrated solution was poured into methanol (400 mL), and a methanol-insoluble component was separated. As a result, a butadiene-styrene copolymer (tin halide terminal-modified SBR) (6.19 g, Mn=9200, Mw=13500, PDI=1.5) was obtained in a yield of 73%. Note that, by IR spectroscopy, cis/trans/vinyl was estimated to be 11/82/7.

$^1$H-NMR of Example 3 (CDCl$_3$, 20° C.): δ=7.2-6.3 (br), 5.5-4.7 (br), 2.7-0.6 (br).

Comparative Example 2: BR

An initiator solution (corresponding to the particular initiator described above) was prepared by using n-BuLi (available from Kanto Chemical Co., Inc.; 1.55 mol/L (hexane solution), 3.3 mL, 5.12 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 1.5 mL), trioctylaluminum (available from Aldrich; 25 wt. % (hexane solution), 9 mL), and cyclohexane (available from Kanto Chemical Co., Inc.; 7 mL). The initiator solution was heated to 60° C., and 1,3-butadiene (available from Aldrich; 15 wt. % (hexane solution), 30.5 g, 84.6 mmol) was added thereto and agitated at 60° C. for 4 hours. After the mixture was cooled to room temperature, methanol (available from Kanto Chemical Co., Inc.; 5 mL) was added to terminate the polymerization. The obtained polymer solution was taken out and concentrated under reduced pressure. The concentrated solution was poured into methanol (400 mL), and a methanol-insoluble component was separated. As a result, a butadiene homopolymer (BR) (3.25 g, Mn=5060, Mw=6070, PDI=1.2) was obtained in a yield of 71%. Note that, by IR spectroscopy, cis/trans/vinyl was estimated to be 8/86/6.

$^1$H-NMR of Comparative Example 2 (CDCl$_3$, 20° C.): δ=5.7-5.2 (br), 5.0-4.8 (br), 2.1-1.8 (br), 1.4-1.3 (br), 1.3-1.2 (br), 0.9-0.8 (br).

Example 4: Cyclic Silazane Terminal-Modified BR

An initiator solution (corresponding to the particular initiator described above) was prepared by using n-BuLi (available from Kanto Chemical Co., Inc.; 1.60 mol/L (hexane solution), 3.3 mL, 5.28 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 1.5 mL), trioctylaluminum (available from Aldrich; 25 wt. % (hexane solution), 9 mL), and cyclohexane (available from Kanto Chemical Co., Inc.; 7 mL). The initiator solution was heated to 60° C., and 1,3-butadiene (available from Aldrich; 15 wt. % (hexane solution), 31.6 g, 87.6 mmol) was added thereto and agitated at 60° C. for 4 hours. After the mixture was cooled to room temperature, 2-n-butyl-1,1-dimethoxy-2-azasilacyclopentane (available from AZmax Co.; 1.23 g) was added to terminate the polymerization. The obtained polymer solution was taken out and concentrated under reduced pressure. The concentrated solution was poured into methanol (400 mL), and a methanol-insoluble component was separated. As a result, a butadiene homopolymer (cyclic silazane terminal-modified BR) (3.65 g, Mn=6010, Mw=7820, PDI=1.3) was obtained in a yield of 77%. Note that, by IR spectroscopy, cis/trans/vinyl was estimated to be 5/87/8.

$^1$H-NMR of Example 4 (CDCl$_3$, 20° C.): δ=5.7-5.2 (br), 5.0-4.9 (br), 3.8-3.5 (br), 2.2-1.8 (br), 1.5-1.3 (br), 1.3-1.2 (br), 0.9-0.8 (br).

Example 5: Cyclic Silazane Terminal-Modified SBR

An initiator solution (corresponding to the particular initiator described above) was prepared by using n-BuLi (available from Kanto Chemical Co., Inc.; 1.55 mol/L (hexane solution), 3.3 mL, 5.12 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 1.5 mL), trioctylaluminum (available from Aldrich; 25 wt. % (hexane solution), 9 mL), and cyclohexane (available from Kanto Chemical Co., Inc.; 7 mL). The initiator solution was heated to 60° C., and a mixture of 1,3-butadiene (available from Aldrich; 15 wt. % (hexane solution), 31.9 g, 88.5 mmol), styrene (available from Kanto Chemical Co., Inc.; 3.98 g, 38.2 mmol), and 4-tert-butylpyrocatechol (0.0635 g, 0.382 mmol) was added thereto and agitated at 60° C. for 4 hours. After the mixture was cooled to room temperature, 2-n-butyl-1,1-dimethoxy-2-azasilacyclopentane (available from AZmax Co.; 1.10 g) was added to terminate the polymerization. The obtained polymer solution was taken out and concentrated under reduced pressure. The concentrated solution was poured into methanol (400 mL), and a methanol-insoluble component was separated. As a result, a butadiene-styrene copolymer (cyclic silazane terminal-modified SBR) (6.31 g, Mn=13400, Mw=19700, PDI=1.5) was obtained in a yield of 72%. Note that, by IR spectroscopy, cis/trans/vinyl was estimated to be 33/61/6.

$^1$H-NMR of Example 5 (CDCl$_3$, 20° C.): δ=7.2-6.3 (br), 5.5-4.7 (br), 3.6-3.4 (br), 2.7-0.4 (br).

Example 6: Titanium Halide Terminal-Modified SBR

An initiator solution (corresponding to the particular initiator described above) was prepared by using n-BuLi (available from Kanto Chemical Co., Inc.; 1.60 mol/L (hexane solution), 3.3 mL, 5.28 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 1.5 mL), trioctylaluminum (available from Aldrich; 25 wt. % (hexane solution), 9 mL), and cyclohexane (available from Kanto Chemical Co., Inc.; 7 mL). The initiator solution was heated to 60° C., and a mixture of 1,3-butadiene (available from Aldrich; 15 wt. % (hexane solution), 33.0 g, 91.5 mmol), styrene (available from Kanto Chemical Co., Inc.; 4.10 g, 39.4 mmol), and 4-tert-butylpyrocatechol (0.0655 g, 0.394 mmol) was added thereto and agitated at 60° C. for 4 hours. After the mixture was cooled to room temperature, titanium tetrachloride (available from Aldrich; 2.12 g) was added to terminate the polymerization. The obtained polymer solution was taken out and concentrated under reduced pressure. The concentrated solution was poured into methanol (400 mL), and a methanol-insoluble component was separated. As a result, a butadiene-styrene copolymer (titanium halide terminal-modified SBR) (6.34 g, Mn=13500, Mw=21200, PDI=1.6) was obtained in a yield of 70%. Note that, by IR spectroscopy, cis/trans/vinyl was estimated to be 37/55/8.

$^1$H-NMR of Example 6 (CDCl$_3$, 20° C.): δ=7.2-6.2 (br), 5.5-4.7 (br), 2.7-0.7 (br).

Example 7: Tin Halide Terminal-Modified SBR

An initiator solution (corresponding to the particular initiator described above) was prepared by using n-BuLi (available from Kanto Chemical Co., Inc.; 1.60 mol/L (hexane solution), 3.3 mL, 5.28 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 1.5 mL), trioctylaluminum (available from Aldrich; 25 wt. % (hexane solution), 9 mL), and cyclohexane (available from Kanto Chemical Co., Inc.; 7 mL). The initiator solution was heated to 60° C., and a mixture of 1,3-butadiene (available from Aldrich; 15 wt. % (hexane solution), 31.8 g, 88.2 mmol), styrene (available from Kanto Chemical Co., Inc.; 3.79 g, 36.4 mmol), and 4-tert-butylpyrocatechol (0.0605 g, 0.364 mmol) was added thereto and agitated at 60° C. for 4 hours. After the mixture was cooled to room temperature, tin chloride (SnCl$_4$) (available from Kanto Chemical Co., Inc.; 2.33 g) was added to terminate the polymerization. The obtained polymer solution was taken out and concentrated under reduced pressure. The concentrated solution was poured into methanol (400 mL), and a methanol-insoluble component was separated. As a result, a butadiene-styrene copolymer (tin halide terminal-modified SBR) (6.08 g, Mn=10100, Mw=18400, PDI=1.8) was obtained in a yield of 71%. Note that, by IR spectroscopy, cis/trans/vinyl was estimated to be 40/53/7.

$^1$H-NMR of Example 7 (CDCl$_3$, 20° C.): δ=7.3-6.2 (br), 5.6-4.7 (br), 2.7-0.7 (br).

Comparative Example 11: SBR

An initiator solution (corresponding to the particular initiator described above) was prepared by using n-BuLi (available from Kanto Chemical Co., Inc.; 1.60 mol/L (hexane solution), 18 mL, 28.8 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 7.5 mL), trioctylaluminum (available from Aldrich; 25 wt. % (hexane solution), 45 mL), and cyclohexane (available from Kanto Chemical Co., Inc.; 10 mL). 60 mL of the obtained initiator solution was added into a cyclohexane (4.24 kg) solution of a mixture of 1,3-butadiene (696 g, 12867 mmol), styrene (available from Kanto Chemical Co., Inc.; 300 g, 2883 mmol), and 4-tert-butylpyrocatechol (4.79 g, 28.8 mmol) and agitated at 60° C. for 14 hours. After the mixture was cooled to room temperature, methanol (available from Kanto Chemical Co., Inc.; 3.44 g) was added to terminate the polymerization. The obtained polymer solution was taken out and concentrated under reduced pressure. The concentrated solution was poured into methanol (5 L), and a methanol-insoluble component was separated. As a result, a butadiene-styrene copolymer (SBR) (876 g, Mn=166000, Mw=295000, PDI=1.8) was obtained in a yield of 88%. Note that, by IR spectroscopy, cis/trans/vinyl was estimated to be 36/61/3.

Example 11: Cyclic Silazane Terminal-Modified SBR

An initiator solution (corresponding to the particular initiator described above) was prepared by using n-BuLi (available from Kanto Chemical Co., Inc.; 1.60 mol/L (hexane solution), 18 mL, 28.8 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 7.5 mL), trioctylaluminum (available from Aldrich; 25 wt. % (hexane solution), 45 mL), and cyclohexane (available from Kanto Chemical Co., Inc.; 10 mL). 60 mL of the obtained initiator solution was added into a cyclohexane (4.29 kg) solution of a mixture of 1,3-butadiene (752 g, 13910 mmol), styrene (available from Kanto Chemical Co., Inc.; 300 g, 2883 mmol), and 4-tert-butylpyrocatechol (4.79 g, 28.8 mmol) and agitated at 60° C. for 14 hours. After the mixture was cooled to room temperature, a cyclohexane (10 mL) mixed solution of N-trimethylsilyl-1,1-dimethoxy-2-azasilacyclopentane (7.39 g) and lithium diisopropylamide (available from Aldrich (2 M solution): 10 mL) was added to terminate the polymerization. The obtained polymer solution was taken out and concentrated under reduced pressure. The concentrated solution was poured into methanol (5 L), and a methanol-insoluble component was separated. As a result, a butadiene-styrene copolymer (cyclic silazane terminal-modified SBR) (884 g, Mn=418000, Mw=668000, PDI=1.6) was obtained in a yield of 84%. Note that, by IR spectroscopy, cis/trans/vinyl was estimated to be 31/65/4.

Example 12: Titanium Halide Terminal-Modified SBR

An initiator solution (corresponding to the particular initiator described above) was prepared by using n-BuLi (available from Kanto Chemical Co., Inc.; 1.60 mol/L (hexane solution), 18 mL, 28.8 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 7.5 mL), trioctylaluminum (available from Aldrich; 25 wt. % (hexane solution), 45 mL), and cyclohexane (available from Kanto Chemical Co., Inc.; 10 mL). 60 mL of the obtained initiator solution was added into a cyclohexane (4.32 kg) solution of a mixture of 1,3-butadiene (583 g, 10778 mmol), styrene (available from Kanto Chemical Co., Inc.; 270 g, 2592 mmol), and 4-tert-butylpyrocatechol (4.31 g, 25.9 mmol) and agitated at 60° C. for 14 hours. After the mixture was cooled to room temperature, titanium tetrachloride (available from Aldrich; 7.24 g) was added to terminate the polymerization. The obtained polymer solution was taken out and concentrated under reduced pressure. The concentrated solution was poured into methanol (5 L), and a methanol-insoluble component was separated. As a result, a butadiene-styrene copolymer (titanium halide terminal-modified SBR) (699 g, Mn=155000, Mw=281000, PDI=1.8) was obtained in a yield of 82%. Note that, by IR spectroscopy, cis/trans/vinyl was estimated to be 49/49/2.

Example 13: Tin Halide Terminal-Modified SBR

An initiator solution (corresponding to the particular initiator described above) was prepared by using n-BuLi (available from Kanto Chemical Co., Inc.; 1.60 mol/L (hexane solution), 18 mL, 28.8 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 7.5 mL), trioctylaluminum (available from Aldrich; 25 wt. % (hexane solution), 45 mL), and cyclohexane (available from Kanto Chemical Co., Inc.; 10 mL). 60 mL of the obtained initiator solution was added into a cyclohexane (4.27 kg) solution of a mixture of 1,3-butadiene (665 g, 12294 mmol), styrene (available from Kanto Chemical Co., Inc.; 300 g, 2883 mmol), and 4-tert-butylpyrocatechol (4.79 g, 28.8 mmol) and agitated at 60° C. for 14 hours. After the mixture was cooled to room temperature, tin chloride (SnCl$_4$) (available from Kanto Chemical Co., Inc.; 7.24 g) was added to terminate the polymerization. The obtained polymer solution was taken out and concentrated under reduced pressure. The concentrated solution was poured into methanol (5 L), and a methanol-insoluble component was separated. As a result, a butadiene-styrene copolymer (tin halide terminal-modified SBR) (859 g, Mn=155000, Mw=341000, PDI=2.2) was obtained in a yield of 89%. Note that, by IR spectroscopy, cis/trans/vinyl was estimated to be 31/67/2.

Example 14: Alkoxysilane Terminal-Modified SBR

An initiator solution (corresponding to the particular initiator described above) was prepared by using n-BuLi (available from Kanto Chemical Co., Inc.; 1.60 mol/L (hexane solution), 18 mL, 28.8 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 7.5 mL), trioctylaluminum (available from Aldrich; 25 wt. % (hexane solution), 45 mL), and cyclohexane (available from Kanto Chemical Co., Inc.; 10 mL). 60 mL of the obtained initiator solution was added into a cyclohexane (4.34 kg) solution of a mixture of 1,3-butadiene (752 g, 13910 mmol), styrene (available from Kanto Chemical Co., Inc.; 300 g, 2883 mmol), and 4-tert-butylpyrocatechol (4.79 g, 28.8 mmol) and agitated at 60° C. for 14 hours. After the mixture was cooled to room temperature, a cyclohexane (10 mL) mixed solution of N,N-bistrimethylsilyl-3-aminopropyltrimethoxysilane (4.54 g) and lithium diisopropylamide (available from Aldrich (2 M solution): 10 mL) was added to terminate the polymerization. The obtained polymer solution was taken out and concentrated under reduced pressure. The concentrated solution was poured into methanol (5 L), and a methanol-insoluble component was separated. As a result, a butadiene-styrene copolymer (alkoxysilyl terminal-modified SBR) (852 g, Mn=384000, Mw=450000, PDI=1.2) was obtained in a yield of 81%. Note that, by IR spectroscopy, cis/trans/vinyl was estimated to be 40/57/3.

Comparative Example 21: SBR

An initiator solution (corresponding to the particular initiator described above) was prepared by using n-BuLi (available from Kanto Chemical Co., Inc.; 1.60 mol/L (hexane solution), 18 mL, 28.8 mmol), divinylbenzene (available from Wako Pure Chemical Industries, Ltd.; 1.24 g, 9.54 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 7.5 mL), trioctylaluminum (available from Aldrich; 25 wt. % (hexane solution), 45 mL), and cyclohexane (available from Kanto Chemical Co., Inc.; 10 mL). 60 mL of the obtained initiator solution was added into a cyclohexane (4.29 kg) solution of a mixture of 1,3-butadiene (709 g, 13098 mmol), styrene (available from Kanto Chemical Co., Inc.; 300 g, 2883 mmol), and 4-tert-butylpyrocatechol (4.79 g, 28.8 mmol) and agitated at 60° C. for 14 hours. After the mixture was cooled to room temperature, methanol (4.24 g) was added to terminate the polymerization. The obtained polymer solution was taken out and concentrated under reduced pressure. The concentrated solution was poured into methanol (5 L), and a methanol-insoluble component was separated. As a result, a butadiene-styrene copolymer (SBR) (852 g, Mn=350000, Mw=490000, PDI=1.4) was obtained in a yield of 84%. Note that, by IR spectroscopy, cis/trans/vinyl was estimated to be 35/61/4.

Example 21: Cyclic Silazane Terminal-Modified SBR

An initiator solution (corresponding to the particular initiator described above) was prepared by using n-BuLi (available from Kanto Chemical Co., Inc.; 1.60 mol/L (hexane solution), 18 mL, 28.8 mmol), divinylbenzene (available from Wako Pure Chemical Industries, Ltd.; 1.99 g, 15.3 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 7.5 mL), trioctylaluminum (available from Aldrich; 25 wt. % (hexane solution), 45 mL), and cyclohexane (available from Kanto Chemical Co., Inc.; 10 mL). 60 mL of the obtained initiator solution was added into a cyclohexane (4.30 kg) solution of a mixture of 1,3-butadiene (721 g, 13330 mmol), styrene (available from Kanto Chemical Co., Inc.; 300 g, 2883 mmol), and 4-tert-butylpyrocatechol (4.79 g, 28.8 mmol) and agitated at 60° C. for 14 hours. After the mixture was cooled to room temperature, a cyclohexane (10 mL) mixed solution of N-trimethylsilyl-1,1-dimethoxy-2-azasilacyclopentane (6.68 g) and lithium diisopropylamide (available from Aldrich (2 M solution): 10 mL) was added to terminate the polymerization. The obtained polymer solution was taken out and concentrated under reduced pressure. The concentrated solution was poured into methanol (5 L), and a methanol-insoluble component was separated. As a result, a butadiene-styrene copolymer (cyclic silazane terminal-modified SBR) (806 g, Mn=383000, Mw=574000, PDI=1.8) was obtained in a yield of 84%.

Example 22: Titanium Halide Terminal-Modified SBR

An initiator solution (corresponding to the particular initiator described above) was prepared by using n-BuLi (available from Kanto Chemical Co., Inc.; 1.60 mol/L (hexane solution), 18 mL, 28.8 mmol), divinylbenzene (available from Wako Pure Chemical Industries, Ltd.; 1.89 g, 14.5 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 7.5 mL), trioctylaluminum (available from Aldrich; 25 wt. % (hexane solution), 45 mL), and cyclohexane (available from Kanto Chemical Co., Inc.; 10 mL). 60 mL of the obtained initiator solution was added into a cyclohexane (4.29 kg) solution of a mixture of 1,3-butadiene (721 g, 13330 mmol), styrene (available from Kanto Chemical Co., Inc.; 300 g, 2883 mmol), and 4-tert-butylpyrocatechol (4.79 g, 28.8 mmol) and agitated at 60° C. for 14 hours. After the mixture was cooled to room temperature, titanium tetrachloride (available from Aldrich; 5.71 g) was added to terminate the polymerization. The obtained polymer solution was taken out and concentrated under reduced pressure. The concentrated solution was poured into methanol (5 L), and a methanol-insoluble component was separated. As a result, a butadiene-styrene copolymer (titanium halide terminal-modified SBR) (844 g, Mn=185000, Mw=322000, PDI=1.7) was obtained in a yield of 84%.

Example 23: Tin Halide Terminal-Modified SBR

An initiator solution (corresponding to the particular initiator described above) was prepared by using n-BuLi (available from Kanto Chemical Co., Inc.; 1.60 mol/L (hexane solution), 18 mL, 28.8 mmol), divinylbenzene (available from Wako Pure Chemical Industries, Ltd.; 1.45 g, 11.1 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 7.5 mL), trioctylaluminum (available from Aldrich; 25 wt. % (hexane solution), 45 mL), and cyclohexane (available from Kanto Chemical Co., Inc.; 10 mL). 60 mL of the obtained initiator solution was added into a cyclohexane (4.29 kg) solution of a mixture of 1,3-butadiene (709 g, 13098 mmol), styrene (available from Kanto Chemical Co., Inc.; 300 g, 2883 mmol), and 4-tert-butylpyrocatechol (4.79 g, 28.8 mmol) and agitated at 60° C. for 14 hours. After the mixture was cooled to room temperature, tin chloride (SnCl$_4$) (available from Kanto Chemical Co., Inc.; 5.68 g) was added to terminate the polymerization. The obtained polymer solution was taken out and concentrated under reduced pressure. The concentrated solution was poured into methanol (5 L), and a methanol-insoluble component was separated. As a result, a butadiene-styrene copolymer (tin halide terminal-modified SBR) (837 g, Mn=288000, Mw=413000, PDI=1.4) was obtained in a yield of 83%.

Comparative Example 31: SBR

An initiator solution (corresponding to the particular initiator described above) was prepared by using n-BuLi (available from Kanto Chemical Co., Inc.; 1.60 mol/L (hexane solution), 18 mL, 28.8 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 7.5 mL), trioctylaluminum (available from Aldrich; 25 wt. % (hexane solution), 45 mL), and cyclohexane (available from Kanto Chemical Co., Inc.; 10 mL). 60 mL of the obtained initiator solution was added into a cyclohexane (4.29 kg) solution of a mixture of 1,3-butadiene (709 g, 13098 mmol), styrene (available from Kanto Chemical Co., Inc.; 300 g, 2883 mmol), and 4-tert-butylpyrocatechol (4.79 g, 28.8 mmol) and agitated at 60° C. for 24 hours. After the mixture was cooled to room temperature, methanol (available from Kanto Chemical Co., Inc.; 4.30 g) was added to terminate the polymerization. The obtained polymer solution was taken out and concentrated under reduced pressure. The concentrated solution was poured into methanol (5 L), and a methanol-insoluble component was separated. As a result, a butadiene-styrene copolymer (SBR) (904 g, Mn=241000, Mw=676000, PDI=2.8) was obtained in a yield of 82%. Note that, by IR spectroscopy, cis/trans/vinyl was estimated to be 44/51/5.

Example 31: N-Methylpyrrolidone Terminal-Modified SBR

An initiator solution (corresponding to the particular initiator described above) was prepared by using n-BuLi (available from Kanto Chemical Co., Inc.; 1.60 mol/L (hexane solution), 18 mL, 28.8 mmol), barium bis(2-ethylhexoxide) (Ba(OCH$_2$CH(C$_2$H$_5$) CH$_2$CH$_2$CH$_2$CH$_3$)$_2$) (available from Strem Chemicals, Inc.; 1 M (toluene/hexane solution) 7.5 mL), trioctylaluminum (available from Aldrich; 25 wt. % (hexane solution), 45 mL), and cyclohexane (available from Kanto Chemical Co., Inc.; 10 mL). 60 mL of the obtained initiator solution was added into a cyclohexane (4.30 kg) solution of a mixture of 1,3-butadiene (709 g, 13098 mmol), styrene (available from Kanto Chemical Co., Inc.; 300 g, 2883 mmol), and 4-tert-butylpyrocatechol (4.79 g, 28.8 mmol) and agitated at 60° C. for 24 hours. After the mixture was cooled to room temperature, N-methylpyrrolidone (2.16 g) was added to terminate the polymerization. The obtained polymer solution was taken out and concentrated under reduced pressure. The concentrated solution was poured into methanol (5 L), and a methanol-insoluble component was separated. As a result, a butadiene-styrene copolymer (N-methylpyrrolidone terminal-modified SBR) (905 g, Mn=241000, Mw=602000, PDI=2.5) was obtained in a yield of 80%. Note that, by IR spectroscopy, cis/trans/vinyl was estimated to be 54/40/6.

For the diene polymers of the examples and the comparative examples, Mn, Mw, PDI, glass transition temperature (Tg), molar ratio of butadiene unit to styrene unit (BD/St), and cis/trans/vinyl are shown in Table 1 below.

Preparation of Diene Polymer Composition (Rubber Composition)

The components shown in Table 2 below were compounded in the proportions (part by mass) shown in Table 2 below.

Specifically, the components shown in Table 2 below except the sulfur and the vulcanization accelerator were first mixed in a Bunbury mixer at 80° C. for 5 minutes. Thereafter, a roll was used to mix the sulfur and the vulcanization accelerator to obtain a diene polymer composition (rubber composition).

Evaluation

The obtained rubber compositions were evaluated as described below.

Low Rolling Resistance

A vulcanized rubber sheet was prepared by press-vulcanizing each of the obtained (unvulcanized) rubber compositions for 15 minutes at 160° C. in a mold (15 cm×15 cm×0.2 cm).

Then, the loss tangent at a temperature of 60° C., tan δ (60° C.), was measured for each produced vulcanized rubber sheet using a viscoelastic spectrometer (available from Toyo Seiki Seisaku-sho, Ltd.) under the following conditions: 10% initial strain, ±2% amplitude, and 20 Hz frequency.

As a result of the low rolling resistance evaluation, Examples 1 to 7, 11 to 14, 21 to 23, and 31 which were the diene polymers produced by polymerizing a monomer containing at least a diene monomer by using the particular initiator and then terminating the polymerization by using the particular electrophile (particular diene polymer) exhibited superior low rolling resistance when used in a tire, compared to the case of Comparative Examples 1 to 2, 11, 21, and 31 which were diene polymers produced by terminating the polymerization without the use of the particular initiator.

Note that, for some of the examples and the comparative examples, the values of tan δ (60° C.) are shown in Table 1. The values are expressed as index values with the value of tan δ (60° C.) of the Example 11 being assigned the index value of 92. Smaller index values indicate smaller tan δ (60° C.) values, which in turn indicate excellent low rolling resistance when used in a tire.

Payne Effect

A vulcanized rubber sheet was produced as described above. The produced vulcanized rubber sheet was then measured for strain-shear modulus G' of 0.28% strain and strain-shear modulus G' of 30.0% strain by using a strain shear stress measurement device (RPA 2000, available from Alpha Technologies), and the difference G' of 0.28 (MPa)–G' 30.0 (MPa) was calculated as the Payne effect.

For some of the examples and the comparative examples, the values of Payne effect are shown in Table 1. The values are expressed as index values with the value of Example 11 being assigned the index value of 52. Smaller index values indicate smaller Payne effect.

Modulus (M300)

A vulcanized rubber sheet was produced as described above. Thereafter, the produced vulcanized rubber sheet was cut out into a dumbbell shape (No. 3 dumbbell shape) having a thickness of 2 mm and used as a test piece. The tensile strength (300%) (stress at 300% stretching) (MPa) was measured in accordance with JIS K 6251:2010.

Note that, for some of the examples and the comparative examples, the values of M300 are shown in Table 1. The values are expressed as index values with the M300 of Example 11 being assigned the index value of 107. Larger index values indicate superior impact resilience and tensile properties.

Wear Test

A vulcanized rubber sheet was produced as described above. The produced vulcanized rubber sheet was measured for the amount of wear in the conditions of a temperature at 20° C. and the slip ratio of 10% by using a Field Performance Simulation (FPS) wear tester.

As a result of the wear test, Examples 1 to 7 exhibited superior wear resistance compared to those of Comparative Examples 1 and 2.

Furthermore, for some of the examples and the comparative examples, the wear resistance index was calculated from the following equation, with the amount of wear of Example 11 being assigned 132. The results are shown in Table 1. Larger index values indicate smaller amounts of wear and superior wear resistance.

Wear resistance index=(amount of wear of Example 11/amount of wear of sample)×132

From the comparison of Comparative Example 11 and Example 11 and Example 14, Example 11 in which cyclic silazane was used as the electrophile and Example 14 in which alkoxysilane was used as the electrophile exhibited superior wear resistances. In particular, Example 11 in which cyclic silazane was used as the electrophile exhibited even better wear resistance. Furthermore, from the comparison between Comparative Example 21 and Example 21, Example 21 in which cyclic silazane was used as the electrophile exhibited superior wear resistance. Furthermore, from the comparison between Comparative Example 31 and Example 31, Example 31 in which the compound represented by Formula (N) described above was used as the electrophile exhibited superior wear resistance.

TABLE 1

| | | Monomer | | Phenol | |
| | Initiator | Butadiene (mmol) | Styrene (mmol) | compound (mmol) | Electrophile |
|---|---|---|---|---|---|
| Comparative Example 1 | Particular 1 | 84.9 | 38.3 | | Methanol |
| Example 1 | Particular 1 | 88.5 | 38.2 | | Cyclic silazane 1 |
| Example 2 | Particular 1 | 90.1 | 38.2 | | Titanium halide |
| Example 3 | Particular 1 | 87.1 | 36.2 | | Tin halide |
| Comparative Example 2 | Particular 1 | 84.6 | | | Methanol |
| Example 4 | Particular 1 | 87.6 | | | Cyclic silazane 1 |
| Example 5 | Particular 1 | 88.5 | 38.2 | 0.382 | Cyclic silazane 1 |
| Example 6 | Particular 1 | 91.5 | 39.4 | 0.394 | Titanium halide |
| Example 7 | Particular 1 | 88.2 | 36.4 | 0.364 | Tin halide |
| Comparative Example 11 | Particular 1 | 12867 | 2883 | 28.8 | Methanol |
| Example 11 | Particular 1 | 13910 | 2883 | 28.8 | Cyclic silazane 2 |
| Example 12 | Particular 1 | 10778 | 2592 | 25.9 | Titanium halide |
| Example 13 | Particular 1 | 12294 | 2883 | 28.8 | Tin halide |
| Example 14 | Particular 1 | 13910 | 2883 | 28.8 | Alkoxysilane |
| Comparative Example 21 | Particular 2 | 13098 | 2883 | 28.8 | Methanol |
| Example 21 | Particular 2 | 13330 | 2883 | 28.8 | Cyclic silazane 2 |
| Example 22 | Particular 2 | 13330 | 2883 | 28.8 | Titanium halide |
| Example 23 | Particular 2 | 13098 | 2883 | 28.8 | Tin halide |
| Comparative Example 31 | Particular 1 | 13098 | 2833 | 28.8 | Methanol |
| Example 31 | Particular 1 | 13098 | 2833 | 28.8 | NMP |

| | Electophile/alkyl Al | Electrophile/metal alcoholate | Mn | Mw | PDI |
|---|---|---|---|---|---|
| Comparative Example 1 | | | 6510 | 7590 | 1.2 |
| Example 1 | 1.35 | 3.61 | 6840 | 8820 | 1.3 |
| Example 2 | 2.71 | 7.24 | 8040 | 11100 | 1.4 |
| Example 3 | 2.90 | 7.77 | 9200 | 13500 | 1.5 |
| Comparative Example 2 | | | 5060 | 6070 | 1.2 |
| Example 4 | 1.51 | 4.03 | 6010 | 7820 | 1.3 |
| Example 5 | 1.35 | 3.61 | 13400 | 19700 | 1.5 |
| Example 6 | 2.78 | 7.45 | 13500 | 21200 | 1.6 |
| Example 7 | 3.06 | 8.19 | 10100 | 18400 | 1.8 |
| Comparative Example 11 | | | 166000 | 295000 | 1.8 |
| Example 11 | 2.25 | 6.02 | 418000 | 668000 | 1.6 |
| Example 12 | 2.55 | 6.83 | 155000 | 281000 | 1.8 |
| Example 13 | 2.55 | 6.83 | 155000 | 341000 | 2.2 |
| Example 14 | 0.83 | 2.22 | 384000 | 450000 | 1.2 |
| Comparative Example 21 | | | 350000 | 490000 | 1.4 |
| Example 21 | 2.03 | 5.45 | 383000 | 574000 | 1.8 |
| Example 22 | 2.01 | 5.39 | 185000 | 322000 | 1.7 |
| Example 23 | 2.00 | 5.36 | 288000 | 413000 | 1.4 |

TABLE 1-continued

| | Tg (° C.) | BD/St | cis/trans/vinyl | tanδ (60° C.) | Payne effect | M300 | Wear test |
|---|---|---|---|---|---|---|---|
| Comparative Example 31 | | | | 241000 | 676000 | 2.8 | |
| Example 31 | | 1.46 | 3.90 | 241000 | 602000 | 2.5 | |

| | Tg (° C.) | BD/St | cis/trans/vinyl | tanδ (60° C.) | Payne effect | M300 | Wear test |
|---|---|---|---|---|---|---|---|
| Comparative Example 1 | | | 11/83/6 | | | | |
| Example 1 | | | 11/85/4 | | | | |
| Example 2 | | | 15/78/7 | | | | |
| Example 3 | | | 11/82/7 | | | | |
| Comparative Example 2 | | | 8/86/6 | | | | |
| Example 4 | | | 5/87/8 | | | | |
| Example 5 | | | 33/61/6 | | | | |
| Example 6 | | | 37/55/8 | | | | |
| Example 7 | | | 40/53/7 | | | | |
| Comparative Example 11 | −84 | 69/31 | 36/61/3 | 100 | 63 | 102 | 91 |
| Example 11 | −85 | 71/29 | 31/65/4 | 92 | 52 | 107 | 132 |
| Example 12 | −75 | 54/46 | 49/49/2 | 75 | 46 | 77 | 100 |
| Example 13 | −73 | 51/49 | 31/67/2 | 72 | 40 | 75 | 86 |
| Example 14 | −81 | 70/30 | 40/57/3 | 96 | 65 | 104 | 103 |
| Comparative Example 21 | −84.5 | 74/26 | 35/61/4 | 102 | 64 | 164 | 121 |
| Example 21 | −87 | 75/25 | 66/27/7 | 86 | 63 | 179 | 125 |
| Example 22 | −80 | 70/30 | 50/44/6 | 79 | 62 | 120 | 111 |
| Example 23 | −82 | 69/31 | 57/38/5 | 78 | 113 | 118 | 78 |
| Comparative Example 31 | −84 | 71/29 | 44/51/5 | 97 | 62 | 136 | 110 |
| Example 31 | −89 | 76/24 | 54/40/6 | 91 | 77 | 138 | 112 |

In Table 1, the column of "initiator" indicates the type of initiator used in each of the examples and the comparative examples, and the types are as follows.

Particular 1: initiator prepared by using an organolithium compound, an alkyl aluminum, and a metal alcoholate Particular 2: initiator prepared by using an organolithium compound, an alkyl aluminum, a metal alcoholate, and an aromatic divinyl In Table 1, "monomer" is as follows. The numerical value indicates the amount (mmol) of monomer used in each of the examples and the comparative examples.

Butadiene: 1,3-butadiene

Styrene: styrene

In Table 1, "phenol compound" is as follows. The numerical value indicates the amount (mmol) of phenol compound used in each of the examples and the comparative examples.

Phenol compound: 4-tert-butylpyrocatechol

In Table 1, the column of "electrophile" indicates the electrophile used in each of the examples and the comparative examples. Details of the electrophile are as follows.

Methanol: methanol

Cyclic silazane 1: 2-n-butyl-1,1-dimethoxy-2-azasilacyclopentane (structure below)

[Chemical Formula 4]

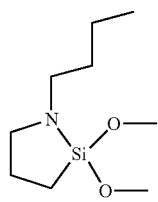

Titanium halide: titanium tetrachloride

Tin halide: tin chloride

Cyclic silazane 2: N-trimethylsilyl-1,1-dimethoxy-2-azasilacyclopentane (structure below)

[Chemical Formula 5]

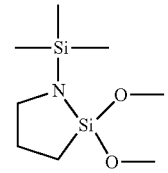

Alkoxysilane: N,N-bistrimethylsilyl-3-aminopropyltrimethoxysilane (structure below; Me represents a methyl group)

[Chemical Formula 6]

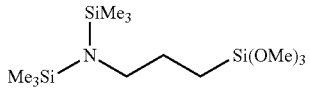

NMP: N-methylpyrrolidone (compound represented by Formula (N) described above)

In Table 1 above, the column of "electrophile/alkyl Al" indicates the proportion of the electrophile to the alkyl aluminum (electrophile/alkyl Al; molar ratio) in each of the examples and the comparative examples.

In Table 1 above, the column of "electrophile/metal alcoholate" indicates the proportion of the electrophile to the metal alcoholate (electrophile/metal alcoholate; molar ratio) in each of the examples and the comparative examples.

TABLE 2

| | |
|---|---|
| Diene polymer | 100.00 |
| Carbon black | 20.00 |
| Silica | 60.00 |
| Stearic acid | 2.00 |
| Processing aid | 2.00 |
| Anti-aging agent | 3.00 |
| Wax | 1.00 |
| Coupling agent | 4.80 |
| Oil | 16.17 |
| Zinc oxide | 3.00 |
| Sulfur | 1.85 |
| Vulcanization accelerator CZ | 2.30 |
| Vulcanization accelerator DPG | 0.65 |

The details of each component shown in Table 2 above are as follows.

Diene polymer: diene polymer (SBR, BR) of each of the examples and the comparative examples Carbon black: Show Black N339 (available from Cabot Japan K.K.)

Silica: ZEOSIL 165GR (available from Rhodia Silica Korea Co., Ltd.)

Stearic acid: Stearic acid YR (available from NOF Corporation)

Processing aid: Aktiplast ST (available from Rhein Chemie)

Anti-aging agent: SANTOFLEX 6PPD (available from Soltia Europe)

Wax: SANNOC (available from Ouchi Shinko Chemical Industrial Co., Ltd.)

Coupling agent: Si69 (available from Evonik Degussa)

Oil: Extract No. 4S (available from Showa Shell Sekiyu K.K.)

Zinc oxide: Zinc Oxide III (available from Seido Chemical Industry Co., Ltd.)

Sulfur: Oil treatment sulfur (available from Karuizawa Refinery Ltd.)

Vulcanization accelerator CZ: NOCCELER CZ-G (available from Ouchi Shinko Chemical Industrial Co., Ltd.)

Vulcanization accelerator DPG: Soxinol D-G (available from Sumitomo Chemical Co., Ltd.)

REFERENCE SIGNS LIST

1 Bead portion
2 Sidewall portion
3 Tire tread portion
4 Carcass layer
5 Bead core
6 Bead filler
7 Belt layer
8 Rim cushion

The invention claimed is:

1. A diene polymer produced by polymerizing a monomer containing at least a diene monomer by using an initiator prepared from an organolithium compound, an alkyl aluminum, and a metal alcoholate, and
then terminating the polymerization by using an electrophile selected from the group consisting of titanium halides, tin halides, cyclic silazanes, alkoxysilanes, epoxides, amines, ketones, and compounds represented by Formula (N):

[Chemical Formula N]

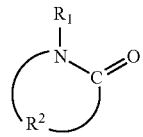

(N)

wherein, $R^1$ represents a hydrogen atom or an alkyl group, and $R^2$ represents an alkylene group,
wherein a terminal of the diene polymer is modified with the electrophile.

2. The diene polymer according to claim 1, wherein a phenol compound is added to a polymerization system when the monomer is polymerized.

3. The diene polymer according to claim 1, wherein a vinyl group content is 20% or less.

4. The diene polymer according to claim 1, wherein a weight average molecular weight is from 1000 to 10000000.

5. The diene polymer according to claim 1, wherein the diene monomer is 1,3-butadiene or isoprene.

6. The diene polymer according to claim 1, wherein the monomer further contains an aromatic vinyl.

7. The diene polymer according to claim 6, wherein the aromatic vinyl is styrene or α-methylstyrene.

8. The diene polymer according to claim 6, wherein a content of the aromatic vinyl in the monomer is at least 20 mol %, and
a glass transition temperature (Tg) is −50° C. or lower.

9. The diene polymer according to claim 1, wherein the initiator is prepared by using the organolithium compound, the alkyl aluminum, the metal alcoholate, and an aromatic divinyl.

10. A method for producing a diene polymer, the method producing a diene polymer by polymerizing a monomer containing at least a diene monomer by using an initiator prepared from an organolithium compound, an alkyl aluminum, and a metal alcoholate, and
then terminating the polymerization by using an electrophile selected from the group consisting of titanium halides, tin halides, cyclic silazanes, alkoxysilanes, epoxides, amines, ketones, and compounds represented by Formula (N):

[Chemical Formula N]

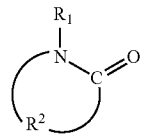

(N)

wherein, $R^1$ represents a hydrogen atom or an alkyl group, and $R^2$ represents an alkylene group,
wherein a terminal of the diene polymer is modified with the electrophile.

11. A rubber composition comprising the diene polymer described in claim 1.

12. The diene polymer according to claim 2, wherein a vinyl group content is 20% or less.

13. The diene polymer according to claim 2, wherein the monomer further contains an aromatic vinyl.

14. The diene polymer according to claim 12, wherein the monomer further contains an aromatic vinyl.

15. The diene polymer according to claim 13, wherein a content of the aromatic vinyl in the monomer is at least 20 mol %, and a glass transition temperature (Tg) is −50° C. or lower.

16. The diene polymer according to claim 14, wherein a content of the aromatic vinyl in the monomer is at least 20 mol %, and a glass transition temperature (Tg) is −50° C. or lower.

17. The diene polymer according to claim 2, wherein the initiator is prepared by using the organolithium compound, the alkyl aluminum, the metal alcoholate, and an aromatic divinyl.

18. The diene polymer according to claim 3, wherein the initiator is prepared by using the organolithium compound, the alkyl aluminum, the metal alcoholate, and an aromatic divinyl.

19. The diene polymer according to claim 6, wherein the initiator is prepared by using the organolithium compound, the alkyl aluminum, the metal alcoholate, and an aromatic divinyl.

20. The diene polymer according to claim 8, wherein the initiator is prepared by using the organolithium compound, the alkyl aluminum, the metal alcoholate, and an aromatic divinyl.

21. The diene polymer according to claim 1, wherein a cis-bond content is 17% or more.

22. The diene polymer according to claim 1, wherein a trans-bond content is 60% or less.

* * * * *